Nov. 24, 1931.    R. D. CARLTON ET AL    1,833,635
CONTROL SURFACE OPERATING MECHANISM FOR AIRCRAFT
Filed July 1, 1927
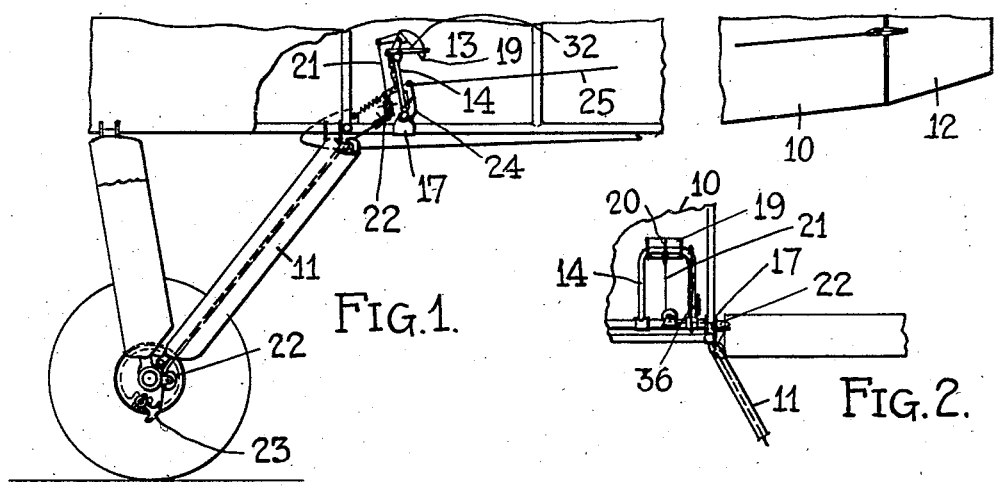
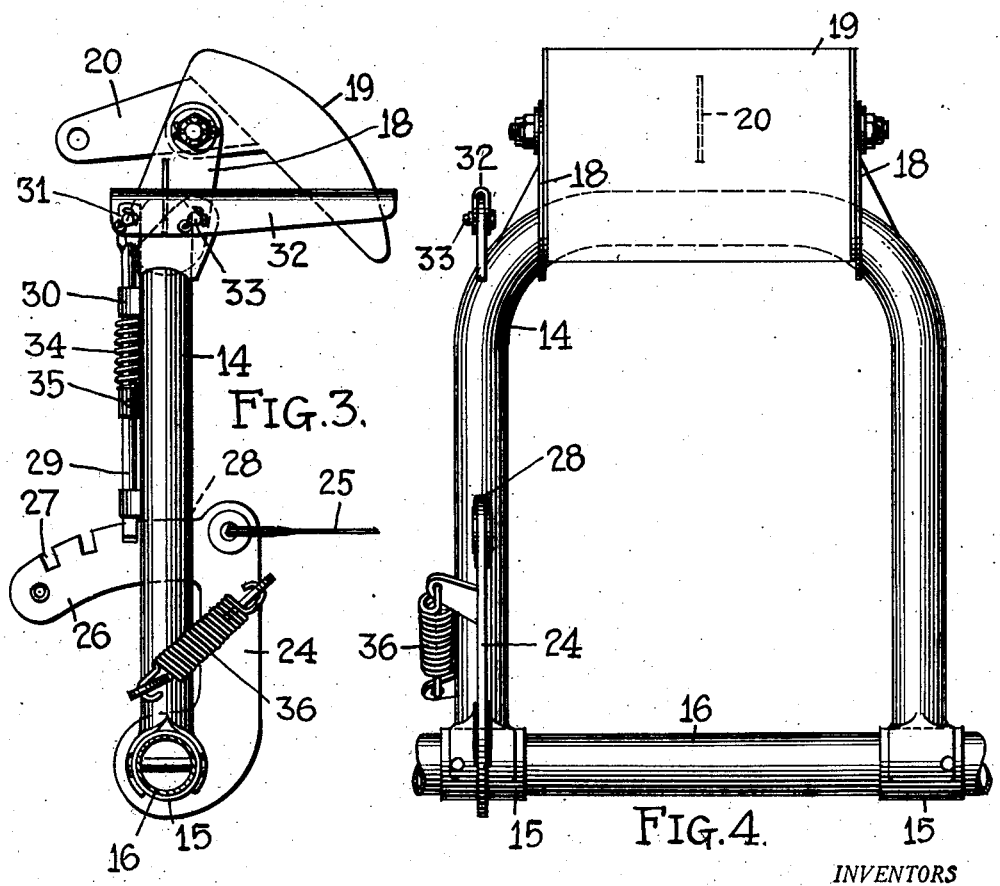
INVENTORS
RALPH D. CARLTON AND HUBERT F. FRANKLIN.
BY
ATTORNEY Patented Nov. 24, 1931

1,833,635

UNITED STATES PATENT OFFICE

RALPH D. CARLTON AND HUBERT F. FRANKLIN, OF HEMPSTEAD, NEW YORK, ASSIGNORS TO CURTISS AEROPLANE & MOTOR COMPANY, INC., A CORPORATION OF NEW YORK

CONTROL SURFACE OPERATING MECHANISM FOR AIRCRAFT

Application filed July 1, 1927. Serial No. 202,799.

Our invention relates to aircraft and is concerned more particularly with the control surface operating mechanism thereof.

An object of the invention is to provide a control surface operating mechanism in which the control device per se, instead of being directly connected with the control surface, has associated with it an operating lever, said control device being adjustable in its relation to said lever, and said lever, regardless of the position of adjustment of said control device, being operable as said control device is moved to correspondingly move said control surface.

A further object of the invention is to provide, in combination with said control surface operating mechanism, a brake control, said brake control being carried by and movable with said adjustable control device and being operable independently thereof to control the brake whether or not said control device is adjusted.

The advantages of such control surface operating mechanism are that the control device can be adjusted toward and from the pilot's seat; that such adjustment can be obtained without disturbing or affecting in any way the control connections extending between the lever and the control surface; that the brake control is movable with the control device under all operating conditions; and that the whole installation is extremely simple, practical, economical and dependable.

Other objects and advantages of the invention will be hereinafter set forth.

In the drawings, wherein like reference characters denote like or corresponding parts, Fig. 1 is a side elevation of a portion of an aeroplane showing the installation of the control surface operating mechanism herein disclosed;

Fig. 2 is a section on the line 2—2 of Fig. 1;

Fig. 3 is a side elevation of the control mechanism per se, and

Fig. 4 is a rear elevation of the structure illustrated in Fig. 3.

In the embodiment of the invention selected for illustration, the under portion only of an aeroplane fuselage is shown. Such fuselage, designated in its entirety as 10, has fastened thereto on its underside a landing gear 11, and has hinged thereto, at its rear end, a control surface 12, the latter, as clearly indicated, being operable by suitable control surface operating mechanism 13. Said control surface operating mechanism preferably comprises spaced pedals 14 (but one of which is shown) mounted on a common axis extending transversely of the fuselage 10. The pedals 14 as indicated, are of substantially inverted U-form. Each extension thereof is provided at its inner or lower end with a suitable collar 15 by means of which said pedal is fastened to its supporting shaft 16. Said supporting shaft 16, which defines the axis of movement of the pedals 14, extends transversely across the fuselage 10 and is journaled at its opposite ends in bearings 17 fastened to the fuselage frame.

At their outer ends, the pedals 14 have fastened thereto spaced ears 18 between which a movable foot rest 19 is pivoted. The pivoted foot rest 19 of each pedal has extended forwardly from its underside an arm 20 to which is fastened a brake operating cord 21. The cords 21 (one for each pedal) are carried over suitable guides 22 and along one of the struts of the landing gear 11, and at their outer ends are fastened to the wheel brake mechanism 23 associated with the landing gear wheels. By rocking the foot rests 19 about their respective pivot axes, the wheel brake mechanism 23 is controlled.

The shaft 16, in addition to the pedals 14, has loosely mounted thereon, at or near each end thereof, an operating lever 24. These levers (one for each pedal) extend off from the shaft 16 at an angle and at or near their outer ends have a direct connection with the control surface 12 by means of control leads 25. Thus connected, any movement imparted to said levers 24 will be directly transmitted to the control surface 12 to govern its operation.

In operating the levers 14 to actuate the control surface 12, the rocking action of the pedals 14 is relied upon. Said pedals 14 are adjustable with respect to the levers 24 and are adapted to be locked in adjusted position. Each lever 24 has formed thereon at its outer or free end a forward extension 26 provided along its upper arcuate edge with cross-slots 27, the extensions 26 in each instance being carried thru openings 28 formed in one of the pedal extensions. Within the cross-slots 27 of the extensions 26 a latch bar 29 is adapted to engage. These latch bars 29 are slidable longitudinally within guides 30 fastened to the pedals 14. At their outer ends, each latch bar 29 is pivotally fastened as at 31 to a trip 32 pivoted as at 33 to its associated pedal. Each trip 32 is located at one side of the foot rest 19. By exerting a downward pressure on the forwardly extending portion of said trip, the latch bar 29 can be raised out of engagement with the cross-slots 27 and the entire pedal 14 pushed forwardly. A spring 34, the moment pressure on the trip 22 is relieved, is instrumental in forcing said latch bar 29 into one or the other of the slots 27. In this way the position of the pedal relatively to the operating lever 24 is adjusted. Said spring 34 preferably encircles the latch bar 29 and bears at its opposite ends against one of the bearings for said latch bar and against collar 35 fastened thereto. If desired, a spring 36 fastened to the lever 34 and to the pedal 14 may be provided to hold and urge the pedal into the position illustrated in Fig. 3. Moreover, if desired, another spring fastened respectively to the fuselage frame and to the lever 34 may be provided to hold and urge said lever in its forward position.

While we have described our invention in detail in its present preferred embodiment, it will be obvious to those skilled in the art after understanding my invention, that various changes and modifications may be made therein without departing from the spirit or scope thereof. We aim in the appended claims to cover all such modifications and changes.

What we claim is:

1. In aircraft, a control surface, a lever movable to actuate said control surface, a pedal movable to actuate said lever, said pedal and said lever having a common axis of rotation and said pedal being adjustable in its relation to said lever, and means for locking said pedal in its adjusted position.

2. In aircraft, a control surface, a lever, a connection between said lever and said control surface, a pedal movable to actuate said lever, said pedal and said lever having a common axis of rotation and said pedal being adjustable in its relation to said lever and a release means carried by said lever to lock it in its adjusted position.

3. In aircraft, a control surface, a shaft, a lever loosely mounted on said shaft, a connection between said lever and said control surface, a pedal fastened to said shaft and adjustable in its relation to said lever, said pedal being movable to actuate said lever, a release and means carried by said pedal engaging said lever to lock said pedal in its adjusted position.

4. In aircraft, the combination, of brake mechanism, a control surface, a lever movable to actuate said control surface, a pedal movable to actuate said lever, said pedal being adjustable in its relation to said lever, means engaging said lever for locking said pedals in its adjusted position, and a control device for said brake mechanism carried by and adjustable with said pedal.

5. A vehicle having, in combination, brakes, a rudder, and controlling means therefor including a pair of devices each of which is connected to one brake and both of which are connected to the rudder, a support, a lever pivotally movable with respect to said support and connected to the rudder, another lever pivotally movable both with respect to said support and with respect to said first mentioned lever and having a part connected to one of the brakes, and means for securing the two levers together in different relative angular positions so that said part can be manipulated to operate the rudder.

6. A vehicle having, in combination, brakes, a rudder, and controlling means therefor including a pair of devices each of which is connected to one brake and both of which are connected to the rudder, a support, a lever pivotally movable with respect to said support and connected to the rudder, another lever pivotally movable both with respect to said support and with respect to said first mentioned lever and having a pedal pivotally mounted thereon and connected to one of the brakes, and means for securing the two levers together in different relative angular positions so that said part can be manipulated to operate the rudder.

7. A vehicle having, in combination, brakes, a rudder, and controlling means therefor including a pair of devices each of which is connected to one brake and both of which are connected to the rudder, and each of which includes a pivoted lever connected to the rudder, another lever pivoted for movement relatively to said first mentioned lever and having a part connected to one of the brakes, and means for securing the two levers together in different relative angular positions so that said part can be manipulated to operate the rudder.

8. A vehicle having, in combination, brakes, a rudder, and controlling means therefor including a pair of devices each of which is connected to one brake and both of which are connected to the rudder, and each of which includes a pivoted lever connected to the rudder, another lever pivoted for movement relatively to said first mentioned lever and having a pedal pivotally mounted thereon and connected to one of the brakes, and means for securing the two levers together in different relative angular positions so that said part can be manipulated to operate the rudder.

9. A vehicle having, in combination, brakes, a rudder, and controlling means therefor including a pair of devices each of which is connected to one brake and both of which are connected to the rudder, and each of which includes a pivoted lever connected to the rudder, another lever pivoted for movement relatively to said first mentioned lever and having a pedal pivotally mounted thereon and connected to one of the brakes by means passing adjacent the pivot axis of the mounting for the second lever, and means for securing the two levers together in different relative angular positions so that said part can be manipulated to operate the rudder.

10. A duplex operating device comprising, in combination, a pivotally mounted lever which has an operating connection, a two-part second lever pivoted for movement relatively to said first mentioned lever and having an operating part intermediate its sides with a second operating connection, and means for securing the two levers, so that the second can operate the first, in different relative angular positions.

11. A duplex operating device comprising, in combination, a pivotally mounted lever which has an operating connection, a second lever pivoted for movement relatively to said first mentioned lever and having an operating pedal pivotally carried thereby and provided with a second operating connection, and means for securing the two levers, so that the second can operate the first, in different relative angular positions.

12. A duplex operating device comprising, in combination a pivotally mounted lever which has an operating connection, a second lever pivoted for movement relatively to said first mentioned lever and having an operating pedal pivotally carried thereby and provided with a second operating connection passing adjacent the axis of movement of the second lever, and means for securing the two levers, so that the second can operate the first, in different relative angular positions.

13. A duplex operating device comprising, in combination, a pivotally mounted lever which has an operating connection, a second lever pivoted for movement relatively to said first mentioned lever and having an operating pedal pivotally carried thereby and provided with a second operating connection passing adjacent the axis of movement of the second lever, and a latch for securing the two levers together in different relative angular positions.

14. A duplex operating device comprising, in combination, a pivotally mounted lever which has an operating connection, a second lever pivoted for movement relatively to said first mentioned lever and having mounted thereon for independent pivotal movement a foot-rest to which is attached a second operating connection, and a latch for securing the two levers together in different relative angular positions.

In testimony whereof we hereunto affix our signatures.

RALPH D. CARLTON.
HUBERT F. FRANKLIN.